(12) United States Patent
Chan et al.

(10) Patent No.: US 10,768,728 B2
(45) Date of Patent: Sep. 8, 2020

(54) DISPLAY MOUNT

(71) Applicant: NCR Corporation, Duluth, GA (US)

(72) Inventors: Seng Chan, Suwanee, GA (US); Adonis C. Codera, Cebu (PH)

(73) Assignee: NCR Corporation, Atlanta, GA (US)

( * ) Notice: Subject to any disclaimer, the term of this patent is extended or adjusted under 35 U.S.C. 154(b) by 74 days.

(21) Appl. No.: 15/883,293

(22) Filed: Jan. 30, 2018

(65) Prior Publication Data

US 2019/0235674 A1 Aug. 1, 2019

(51) Int. Cl.

| G06F 3/041 | (2006.01) |
|---|---|
| G06F 1/16 | (2006.01) |
| G07G 1/01 | (2006.01) |
| G07F 19/00 | (2006.01) |
| G07G 1/00 | (2006.01) |
| G02F 1/1333 | (2006.01) |
| F16M 13/00 | (2006.01) |
| H04M 1/02 | (2006.01) |

(52) U.S. Cl.
CPC ......... G06F 3/0412 (2013.01); F16M 13/005 (2013.01); G02F 1/133308 (2013.01); G06F 1/1601 (2013.01); G06F 1/1607 (2013.01); G06F 1/1637 (2013.01); G07F 19/205 (2013.01); G07G 1/0018 (2013.01); G07G 1/01 (2013.01); H04M 1/0266 (2013.01); *G02F 2201/46* (2013.01); *G02F 2201/503* (2013.01); *G06F 2200/1613* (2013.01); *G06F 2203/04103* (2013.01)

(58) Field of Classification Search
CPC .... G06F 3/0412; G06F 1/1607; G06F 1/1637; G06F 2200/1613; G06F 2203/04103; F16M 13/005; H04M 1/0266
See application file for complete search history.

(56) References Cited

U.S. PATENT DOCUMENTS

| 2006/0098134 A1* | 5/2006 | Park | G02F 1/133308 |
|---|---|---|---|
| | | | 349/58 |
| 2013/0063920 A1* | 3/2013 | Farahani | G06F 1/1637 |
| | | | 361/807 |
| 2016/0044801 A1* | 2/2016 | Lee | H04M 1/0202 |
| | | | 361/679.55 |
| 2018/0356857 A1* | 12/2018 | Shaw | G06F 1/1601 |

* cited by examiner

*Primary Examiner* — Peter D McLoone
(74) *Attorney, Agent, or Firm* — Schwegman, Lundberg & Woessner

(57) ABSTRACT

Disclosed herein is an assembly for mounting a screen. The assembly may include a bracket, a plurality of pistons, and a plurality of compression members. The bracket may define a plurality of through holes. Each of the plurality of pistons may pass through a corresponding one of the plurality of through holes. Each of the plurality of compression members may be located proximate a corresponding one of the plurality of pistons.

14 Claims, 2 Drawing Sheets

DISPLAY MOUNT

SUMMARY

Disclosed herein is an assembly for mounting a screen. The assembly may include a bracket, a plurality of pistons, and a plurality of compression members. The bracket may define a plurality of through holes. Each of the plurality of pistons may pass through a corresponding one of the plurality of through holes. Each of the plurality of compression members may be located proximate a corresponding one of the plurality of pistons.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1:
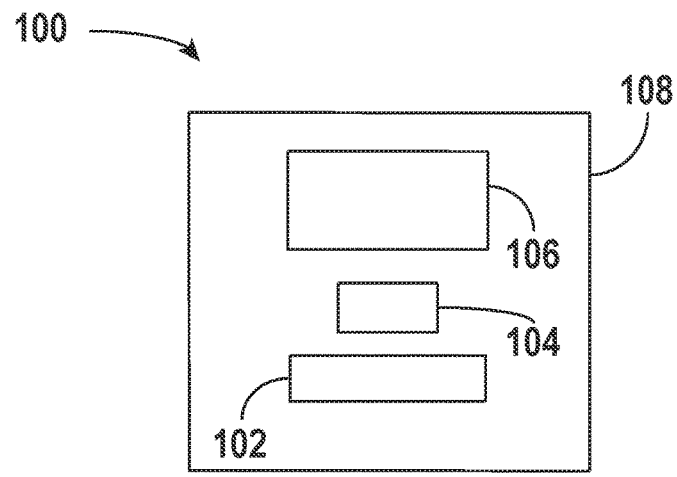
FIG. 1 shows an example self-service terminal consistent with this disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the disclosed systems. Accordingly, the following detailed description does not limit this disclosure. Instead, the proper scope of any invention disclosed herein is defined by the appended claims.

An On-Cell Touch Panel (OTP) is a new technology that integrates a touch sensor with a display panel such as a liquid crystal display (LCD) panel. The OTP may be integrated into a display assembly such that the expensive display is protected by an inexpensive outer panel of glass. For example, an expensive touchscreen display may be paired with and protected using inexpensive non-touch outer glass. However, separation between the outer glass and panel over time may cause touch issues. As disclosed herein, a display mount may constrain the OTP in all directions to perform under load and vibration while still allowing the OTP to float vertically thereby maintaining a constant reliable pressure against the outer non-touch glass.

As disclosed herein, there is a cost and service advantage to using the display mount disclosed herein. The OTP is cheaper than the conventional outer PCAP glass and LCD designs. The touch sensor is in the OTP so the outer glass is non-touch. Stated another way, the expensive OTP is protected by the outer, cheaper, non-touch glass. Service personal can reuse the OTP and discard the cheaper non-touch glass should the outer glass be damaged. In the conventional PCAP-LCD design, the PCAP glass is expensive and exposed to environment because it is a touch surface.

As disclosed herein, the display mount may include a bracket to which the display is attached in a spring-loaded fashion at a plurality of standoffs. Compression members such as coil springs, that are highly reliable and do not form a memory, or set, over time may be used. The compression members may be rated for hundreds of thousands of cycles so as to have a long life. Each loaded standoff may be pressed against landings on the OTP (i.e., a LCD). The landings can be loaded without damaging the OTP. The OTP may be constrained to the bracket with a number of shoulder screws or bolts that fit into a number of vertical slots in the bracket. This may allow the OTP to be constrained in all directions while still allowing vertical float. When the OTP bracket subassembly is assembled to the carrier and non-touch glass, the OTP may be pressed against the non-touch glass. The bracket designs may allow the OTP to be constrained without being affected by external loads and vibration while maintaining consistent contact to the outer non-touch glass.

FIG. 1 shows an example self-service terminal (SST) 100 consistent with this disclosure. As shown in FIG. 1, the SST 100 may include media handler 102, a keypad 104, and a display module 106. The media handler 102, the keypad 104, and the display module 106 may be contained in a housing 108.

The media handler 102 may accept media and may dispense media. For example, the media handler 102 may accept or dispense currency notes. In addition, the media handler 102 may accept commercial paper such checks or other bearer instruments. For instance, the media handler 102 can be a component of an automated teller machine (ATM) or self-checkout terminal and the media handler 102 can except and dispense currency notes, checks, or other paper forms of payment.

The keypad 104 can be an input device that allows a user to input data. For example, the keypad 104 can allow the user to enter a personal identification number (PIN). The keypad 104 also can allow the user to enter other information such as a loyalty rewards program number etc.

Figure 2:
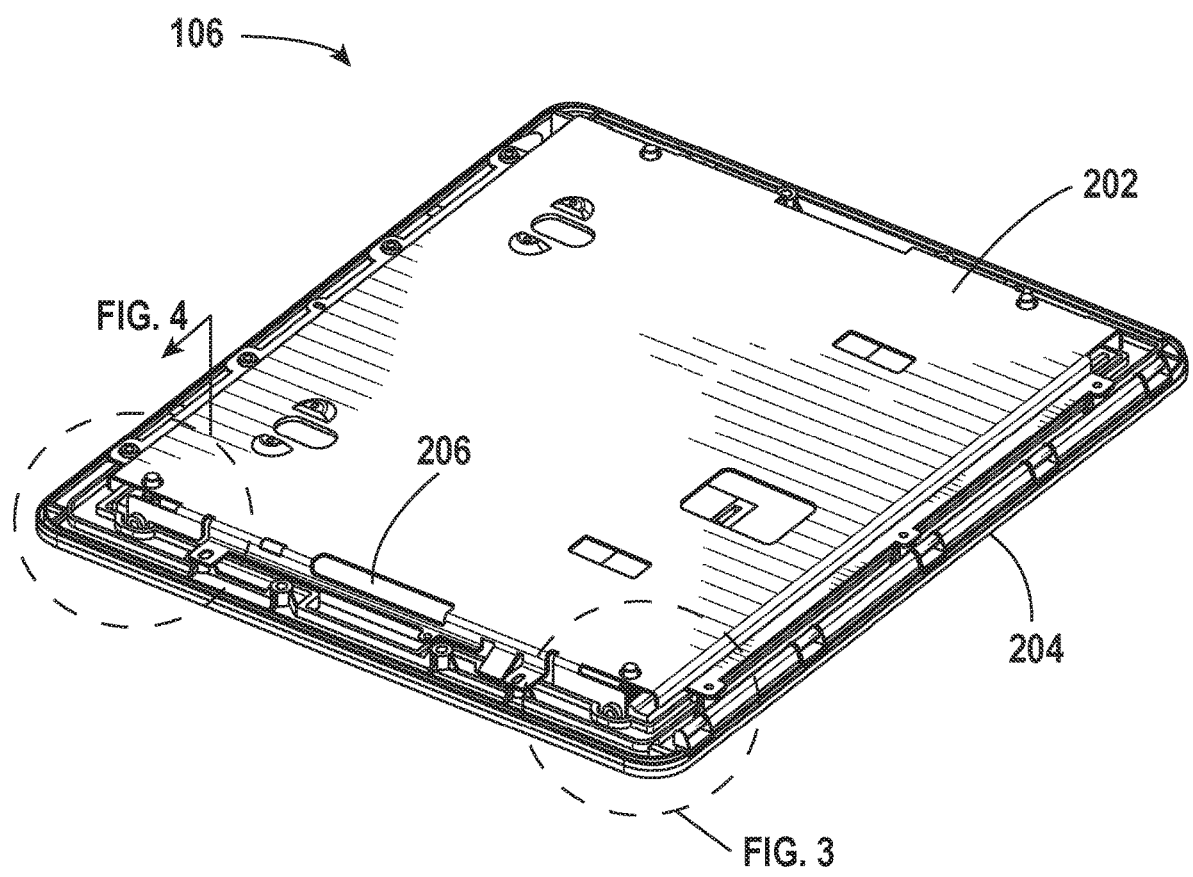
FIG. 2 shows an example display module consistent with this disclosure.

As disclosed herein, the display module 106 may include multiple components. As shown in FIG. 2, the display module 106 may include a bracket 202, a frame 204, and a display 206. The bracket 202 may be manufactured out of metal or other ridged materials. The bracket 202 may be stamped from a sheet of metal, injection molded from a ridged polymer, etc. to conform to a shape similar to that of the display 206. As a result, the display 206 may be partially enclosed within a cavity defined by the bracket 202 and the frame 204.

Figure 3:
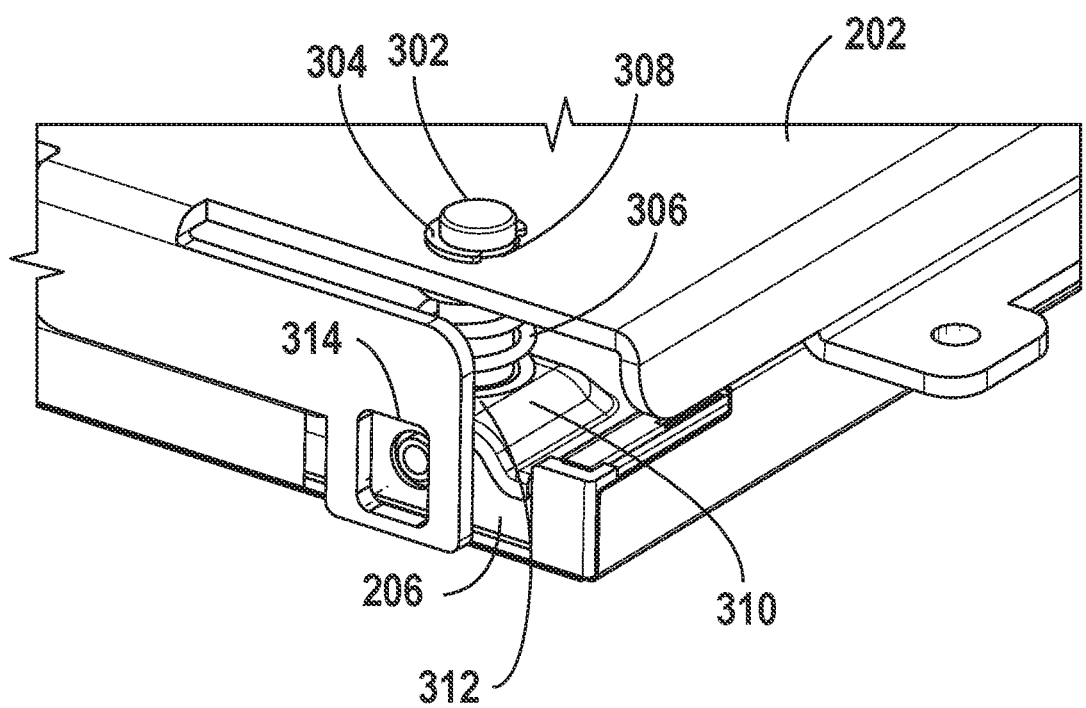
FIG. 3 shows an example detail of the display module consistent with this disclosure.

FIG. 3 shows a detail for the display module 106. As shown in FIG. 3, the display module 106 may include a piston 302, a retaining member 304, and a compression member 306. The piston 302 may pass through a hole 308 formed in the bracket 202. The piston 302 also may arrest against an elevated portion 310 formed by the display 206. The elevated portion 310 may be a point on the display 206 with an increased strength so as to withstand pressure from the piston 302. As shown in FIG. 3, the elevated portion 310 may include a contact point 312. The contact point 312 may identify the elevated portion 310 so that the display 206 is positioned properly with respect to the bracket 202 so as to avoid damage to the display 206 by the piston 302.

Figure 4:
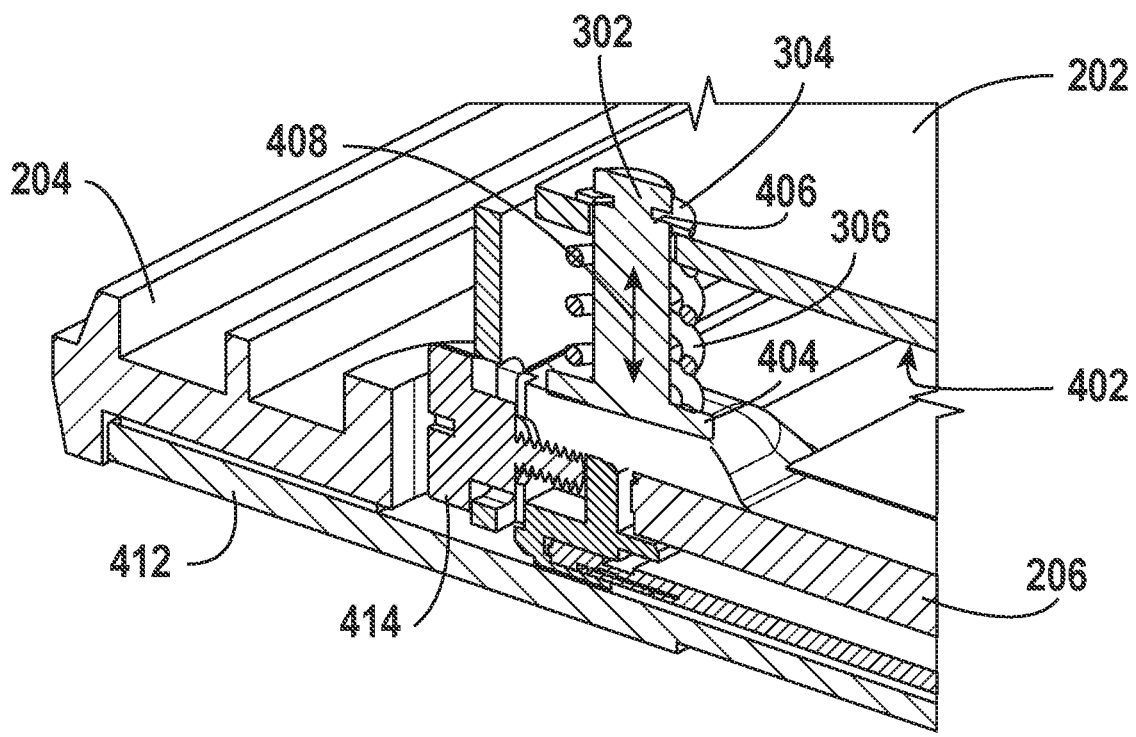
FIG. 4 shows a section view of an example detail of the display module consistent with this disclosure.

The piston 302 may be held in place by the compression member 306 and the retaining member 304. As shown in FIG. 4, the compression member 306 may press against a first surface 402 of the bracket 202 and a flange 404 of the piston 302. The compression member 306 may be a coil spring as shown in FIG. 4. The compression member 306 may also be a resilient element such as a foam member that may provide a compression force to hold the piston against the display 206. The compression member 306 may also be a leaf spring or other member that can exert a force between the bracket 202 and the display 206.

The retaining member 304 may be a c-clip or other member that may rest in a groove 406. The retaining member 304 and the compression member 306 may allow the piston to move as indicated by arrow 408. As a result, the display 206 may move independently of a glass panel 412. As shown in FIG. 4, the glass panel 412 may be connected to the frame 204. For example, the glass panel 412 may be connected to the frame 204 via an adhesive. In addition, the glass panel may include a number of holes such that the glass panel 412 may be screwed to the frame.

As shown in FIGS. 3 and 4, the bracket 202 may define an opening 314. A shoulder screw 414 may pass through the opening 314 and into the display 206. The shoulder screw 414 may secure the display 206 to the bracket 202 such that movement of the display 206 is restricted to a single direction as shown by arrow 408. As shown in the figures, there may be one piston 302 located proximate each corner of the bracket 202. Having the pistons 302 located at each corner of the bracket 202 and display 206 may allow for an even distribution of pressure to be placed on the display 206 and result in a more uniform contact between the display 206 and the glass panel 412.

The bracket 202, the pistons 302, and the compression members 306 may press the display 206 up against the glass panel 412 such that a touch field generated by the display 206 may penetrate the glass panel 412. Because the touch field penetrates the glass panel 412, the glass panel 412 may be "dumb glass." Stated another way, the glass panel 412 is not a touch glass. In other words, the glass panel 412 can be an ordinary piece of glass instead of an expensive piece of glass that is able to detect capacitance changes or otherwise detect a user's touch.

As disclosed herein, having the display 206 move as indicated by arrow 408 and be detached from the glass panel 412 may allow the glass panel 412 and the display 206 to be serviced or otherwise repaired. In addition, having the glass panel 412 and the display 206 independently movable of each other may also allow for reduction in stressed placed on the glass panel 412 and the display 206, For example, because the glass panel 412 and the display 206 are not attached to one another, stresses placed on the glass panel 412 may not transfer to the display 206 and vice versa. For instance, mechanical stresses placed on the glass by user abuse may not be transferred to the display 206. In addition, thermal stresses that may be cause by heating or cooling of the glass panel 412 or display 206 may be isolated and not transferred between the glass panel 412 and the display 206.

EXAMPLES

Example 1 is an assembly for mounting a screen, the assembly comprising: a bracket defining a plurality of through holes; a plurality of pistons, each of the plurality of pistons passing through a corresponding one of the plurality of through holes; and a plurality of compression members, each of the plurality of compression members located proximate a corresponding one of the plurality of pistons.

In Example 2, the subject matter of Example 1 optionally includes wherein the plurality of compression members are a plurality of compression springs, each of the plurality of compression springs encircling the corresponding one of the plurality of pistons.

In Example 3, the subject matter of any one or more of Examples 1-2 optionally include wherein the plurality of compression members are a plurality of foam elements, each of the plurality of foam elements encircling the corresponding one of the plurality of pistons.

In Example 4, the subject matter of any one or more of Examples 1-3 optionally include wherein the plurality of compression members are a plurality of leaf springs, each of the plurality of leaf springs located proximate the corresponding one of the plurality of pistons.

In Example 5, the subject matter of any one or more of Examples 1-4 optionally include a plurality of retaining members, each of the plurality of retaining member attached to a least a corresponding one of the plurality of pistons.

In Example 6, the subject matter of Example 5 optionally includes wherein the plurality of retaining members are c-clips.

Example 7 is a display LCD unit comprising: a display unit; a display mount comprising: a bracket defining a plurality of through holes, a plurality of pistons, each of the plurality of pistons passing through a corresponding one of the plurality of through holes and resting against the display unit, and a plurality of compression members, each of the plurality of compression members located proximate a corresponding one of the plurality of pistons; and a glass panel located adjacent to the display unit such that the plurality of pistons and the plurality of compression members press the display unit against the glass panel.

In Example 8, the subject matter of Example 7 optionally includes wherein the display unit is a liquid crystal display (LCD).

In Example 9, the subject matter of any one or more of Examples 7-8 optionally include wherein the plurality of compression members are a plurality of compression springs, each of the plurality of compression springs encircling the corresponding one of the plurality of pistons.

In Example 10, the subject matter of any one or more of Examples 7-9 optionally include wherein the plurality of compression members are a plurality of foam elements, each of the plurality of foam elements encircling the corresponding one of the plurality of pistons.

In Example 11, the subject matter of any one or more of Examples 7-10 optionally include wherein the plurality of compression members are a plurality of leaf springs, each of the plurality of leaf springs located proximate the corresponding one of the plurality of pistons.

In Example 12, the subject matter of any one or more of Examples 7-11 optionally include a plurality of retaining members, each of the plurality of retaining member attached to a least a corresponding one of the plurality of pistons.

In Example 13, the subject matter of Example 12 optionally includes wherein the plurality of retaining members are c-clips.

In Example 14, the subject matter of any one or more of Examples 7-13 optionally include wherein the glass panel is dumb glass.

Example 15 is a self-service terminal comprising: a touch screen display unit; a display mount comprising: a bracket defining a plurality of through holes, a plurality of pistons, each of the plurality of pistons passing through a corresponding one of the plurality of through holes and resting against the display unit; and a plurality of compression members, each of the plurality of compression members located proximate a corresponding one of the plurality of pistons; and a glass panel located adjacent to the display unit such that the plurality of pistons and the plurality of compression members press the display unit against the glass panel so that a touch field generated by the touch screen display penetrates the glass panel.

In Example 16, the subject matter of Example 15 optionally includes wherein the display unit is a liquid crystal display (LCD).

In Example 17, the subject matter of any one or more of Examples 15-16 optionally include wherein the plurality of compression members are a plurality of compression springs, each of the plurality of compression springs encircling the corresponding one of the plurality of pistons.

In Example 18, the subject matter of any one or more of Examples 15-17 optionally include wherein the plurality of compression members are a plurality of foam elements, each of the plurality of foam elements encircling the corresponding one of the plurality of pistons.

In Example 19, the subject matter of any one or more of Examples 15-18 optionally include a plurality of retaining members, each of the plurality of retaining member attached to a least a corresponding one of the plurality of pistons.

In Example 20, the subject matter of Example 19 optionally includes wherein the plurality of retaining members are c-clips.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A display LCD unit comprising:
   a display unit including a plurality of elevated portions;
   a monolithic display mount comprising:
      a bracket defining a first plurality of through holes and a second plurality of through holes,
      a plurality of pistons, each of the plurality of pistons passing through a corresponding one of the first plurality of through holes and resting against one of the plurality of elevated portions of the display unit,
      a plurality of compression members, each of the plurality of compression members located proximate a corresponding one of the plurality of pistons, and
      a plurality of shoulder screws, each of the plurality of shoulder screws passing through a corresponding one of the second plurality of through holes, the shoulder screws arranged to restrict motion of the display unit to a direction normal to a first surface of the bracket; and
   a glass panel located adjacent to the display unit such that the plurality of pistons and the plurality of compression members press the display unit against the glass panel in the direction normal to the first surface.

2. The display of claim 1, wherein the display unit is a liquid crystal display (LCD).

3. The display of claim 1, wherein the plurality of compression members are a plurality of compression springs, each of the plurality of compression springs encircling the corresponding one of the plurality of pistons.

4. The display of claim 1, wherein the plurality of compression members are a plurality of foam elements, each of the plurality of foam elements encircling the corresponding one of the plurality of pistons.

5. The display of claim 1, wherein the plurality of compression members are a plurality of leaf springs, each of the plurality of leaf springs located proximate the corresponding one of the plurality of pistons.

6. The display of claim 1, further comprising a plurality of retaining members, each of the plurality of retaining member attached to a least a corresponding one of the plurality of pistons.

7. The display of claim 6, wherein the plurality of retaining members are c-clips.

8. The display of claim 1, wherein the glass panel is dumb glass.

9. A self-service terminal comprising:
   a touch screen display unit including a plurality of elevated portions;
   a monolithic display mount comprising:
      a bracket defining a first plurality of through holes and a second plurality of through holes,
      a plurality of pistons, each of the plurality of pistons passing through a corresponding one of the first plurality of through holes and resting against one of the plurality of elevated portions of the display unit,
      a plurality of compression members, each of the plurality of compression members located proximate a corresponding one of the plurality of pistons, and
      a plurality of shoulder screws, each of the plurality of shoulder screws passing through a corresponding one of the second plurality of through holes, the shoulder screws arranged to restrict motion of the touch screen display unit to a direction normal to a first surface of the bracket; and
   a glass panel located adjacent to the display unit such that the plurality of pistons and the plurality of compression members press the display unit against the glass panel in the direction normal to the first surface so that a touch field generated by the touch screen display penetrates the glass panel,
   wherein the first surface of the bracket and the glass panel are parallel to one another.

10. The self-service terminal of claim 9, wherein the display unit is a liquid crystal display (LCD).

11. The self-service terminal of claim 9, wherein the plurality of compression members are a plurality of compression springs, each of the plurality of compression springs encircling the corresponding one of the plurality of pistons.

12. The self-service terminal of claim 9, wherein the plurality of compression members are a plurality of foam elements, each of the plurality of foam elements encircling the corresponding one of the plurality of pistons.

13. The self-service terminal of claim 9, further comprising a plurality of retaining members, each of the plurality of retaining member attached to a least a corresponding one of the plurality of pistons.

14. The self-service terminal of claim 13, wherein the plurality of retaining members are c-clips.

* * * * *